US008886817B2

(12) United States Patent
Ting et al.

(10) Patent No.: US 8,886,817 B2
(45) Date of Patent: Nov. 11, 2014

(54) FEDERATION AND INTEROPERABILITY BETWEEN SOCIAL NETWORKS

(75) Inventors: Chyr-Chong Ting, San Jose, CA (US); Adam Hyder, Los Altos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1167 days.

(21) Appl. No.: 12/125,626

(22) Filed: May 22, 2008

(65) Prior Publication Data

US 2009/0292814 A1  Nov. 26, 2009

(51) Int. Cl.
G06F 15/16 (2006.01)
(52) U.S. Cl.
CPC ........................... G06F 15/16 (2013.01)
USPC ............ 709/229; 709/226; 709/227; 709/228
(58) Field of Classification Search
USPC .......................................................... 709/229
See application file for complete search history.

(56) References Cited

U.S. PATENT DOCUMENTS

| 7,237,256 | B2 * | 6/2007 | Cheng et al. ........................ 726/3 |
| 7,610,390 | B2 * | 10/2009 | Yared et al. .................... 709/229 |
| 7,747,746 | B2 * | 6/2010 | Thayer et al. ................. 709/225 |
| 7,958,192 | B2 * | 6/2011 | Harik et al. .................... 709/204 |
| 2002/0124053 | A1 * | 9/2002 | Adams et al. ................. 709/216 |
| 2005/0216300 | A1 * | 9/2005 | Appelman et al. ................. 705/1 |
| 2006/0218153 | A1 * | 9/2006 | Voon et al. ....................... 707/10 |
| 2007/0050446 | A1 * | 3/2007 | Moore ............................ 709/203 |
| 2007/0150603 | A1 * | 6/2007 | Crull et al. .................... 709/227 |
| 2007/0289006 | A1 * | 12/2007 | Ramachandran et al. ...... 726/10 |
| 2008/0009272 | A1 * | 1/2008 | Toledano .................... 455/414.1 |
| 2008/0021997 | A1 * | 1/2008 | Hinton .......................... 709/225 |
| 2008/0182563 | A1 * | 7/2008 | Wugofski et al. .......... 455/414.2 |
| 2008/0214148 | A1 * | 9/2008 | Ramer et al. ............... 455/414.1 |
| 2008/0270248 | A1 * | 10/2008 | Brill ................................. 705/26 |
| 2009/0271247 | A1 * | 10/2009 | Karelin et al. ................... 705/10 |
| 2010/0095009 | A1 * | 4/2010 | Matuszewski et al. ........ 709/228 |
| 2010/0153535 | A1 * | 6/2010 | Thayer et al. ................. 709/223 |

OTHER PUBLICATIONS

"Google Launches OpenSocial to Spread Social Applications Across the Web," Press Release dated Nov. 1, 2007. Found at http://www.google.com/intl/en/press/pressrel/opensocial.html.
"Details Revealed: Google OpenSocial to Launch Thursday," by Michael Arrington, Oct. 30, 2007. Found at http://www.techcrunch.com/2007/10/30/details-revealed-google-opensocial-to-be-common-apis-for-buil . . . .
"Two-phase commit protocol," Wikipedia, Mar. 14, 2008. Found at http://en.wikipedia.org/wiki/Two-phase_commit.

(Continued)

*Primary Examiner* — Umar Cheema
(74) *Attorney, Agent, or Firm* — James J. DeCarlo; Greenberg Traurig, LLP

(57) ABSTRACT

Communications between social networks are enabled via authentication that provides single-sign-on (SSO) authentication of users such as individual users or social networks or social network services that desire access to network resources on a particular social network. The particular network requests authentication of the requesting user(s), and based on an authentication result the particular network provides or denies access to the resources. A social network services database maintains a listing of resources of different social networks, that a user can search to determine where to find resources on other networks. The user can then query the social networks hosting those resources or their social network services for access, and the networks or services can authenticate the user before granting access according to any conditions that the hosting social networks or social network services may choose to apply.

22 Claims, 5 Drawing Sheets

(56) References Cited

OTHER PUBLICATIONS

"Facebook," Wikipedia, May 20, 2008. Found at http://en.wikipedia.org/wiki/Facebook.
"Beagle (software)," Wikipedia, Mar. 16, 2008. Found at http://en.wikipedia.org/wiki/Beagle_%28software%29.
"Findmeon beta—the cure for multiple web personality disorder," FindMeOn.com, Mar. 24, 2008. Found at http://www.findmeon.com/relaunch/.
"Spoken," Wikipedia, Mar. 9, 2008. Found at http://en.wikipedia.org/wiki/Spokeo.
"Destructuring.net," Jan. 10, 2008. Found at http://www.destructuring.net/archives/2008/01/the_huge_postin.html.
"Windows CardSpace," Wikipedia, May 6, 2008. Found at http://en.wikipedia.org/wiki/Cardspace.
"Plaxo," Wikipedia, Apr. 29, 2008. Found at http://en.wikipedia.org/wiki/Plaxo.
"OpenID," Wikipedia, May 7, 2008. Found at http://en.wikipedia.org/w/index.php?title=OpenID&oldid=210729877.

* cited by examiner

FEDERATION AND INTEROPERABILITY BETWEEN SOCIAL NETWORKS

TECHNICAL FIELD

The present invention relates generally to managing network information, and more particularly to exchanging information between social networks and accessing and storing information within social networks.

BACKGROUND

Tremendous changes have been occurring in the Internet that influence our everyday lives. For example, online social networks have become the new meeting grounds. The development of such online social networks touch countless aspects of our everyday lives, providing instant access to people of similar mindsets, and enabling us to form partnerships with more people in more ways than ever before.

Generally a social network is a social structure, made of nodes (which are generally individuals or organizations) that are tied by one or more specific types of interdependency, such as values, visions, ideas, financial exchange, friends, kinship, dislike, conflict, trade, web links, sexual relations, disease transmission (epidemiology), or airline routes. Social relationships can be viewed in terms of nodes and ties, where nodes represent individual actors in social networks, and ties represent relationships between such actors, so that in its simplest form, a social network is a map of the relevant ties between the nodes being studied.

Also, a social network service uses software to build online social networks for communities of people who share interests and activities or who are interested in exploring the interests and activities of others. Social network services can be network-based such as the Internet-based and can enable users to communicate or interact in different ways. For example, users of a social network could interact via messaging, email, discussion groups, chat rooms, file-sharing, blogging, developing and maintaining lists of contacts, and so forth.

One of the more useful features of the Internet and associated forms of communication such as e-mail, instant messaging, chat rooms and forums is access to information that is useful in everyday work and social lives. However, social networks often operate in separate silos and do not share information. Accordingly, potentially beneficial social connections and corresponding information flows between users or members of different social networks go unrealized, and users who are members of multiple social networks may find it difficult to use or benefit from all features of those social networks to which they belong. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
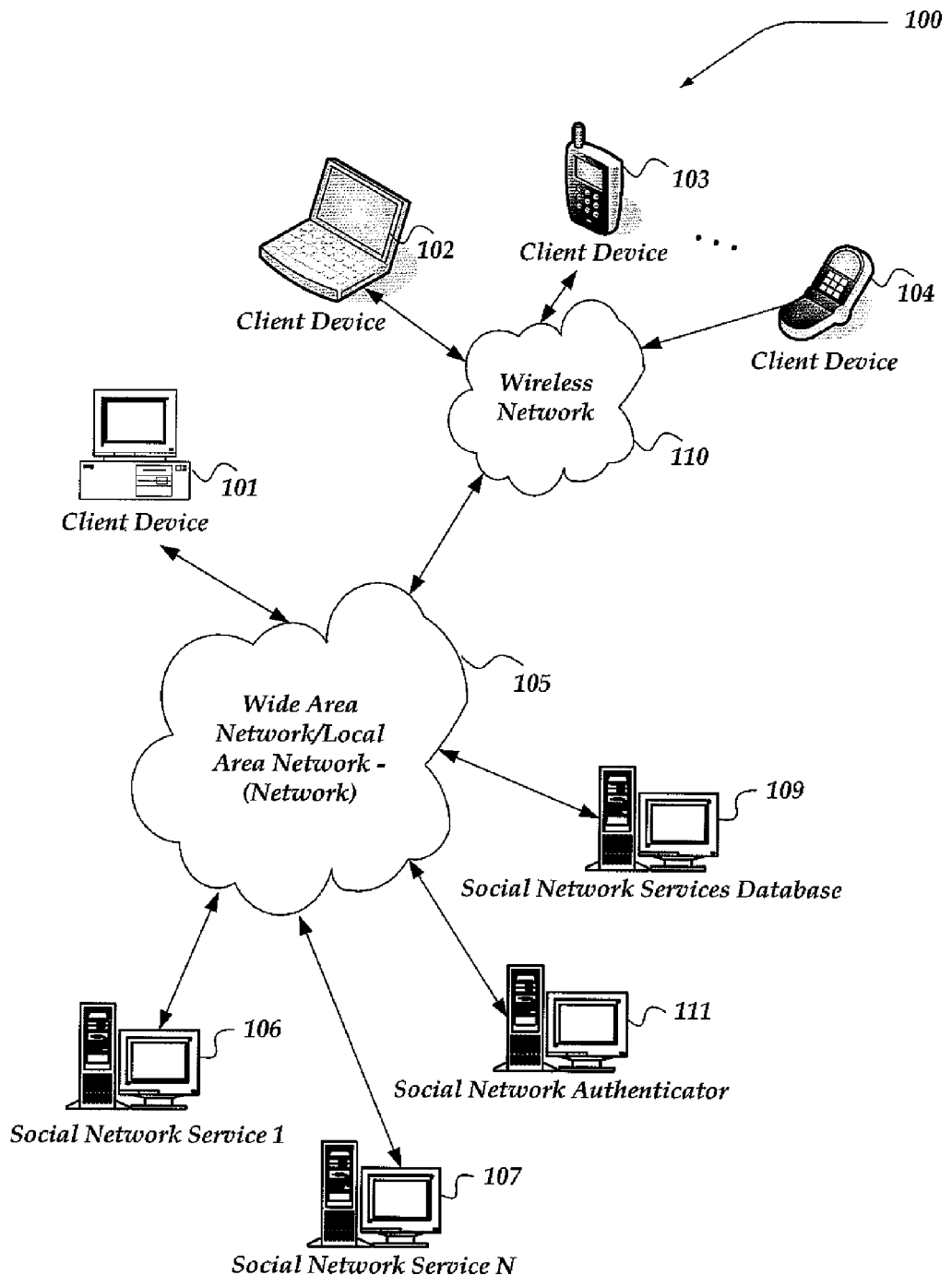
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments of the invention. However, this invention may be embodied in many different forms and should not be construed as limited to the embodiments set forth herein. Rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. Therefore, the following detailed description is not to be taken in a limiting sense.

Throughout the specification and claims, the following terms take the meanings explicitly associated herein, unless the context clearly dictates otherwise. The phrase "in one embodiment" does not necessarily refer to the same embodiment, although it may. Furthermore, the phrase "in another embodiment" does not necessarily refer to a different embodiment, although it may. Thus, as described below, various embodiments of the invention may be readily combined without departing from the scope or spirit of the invention.

As used herein, the term "social network" refers generally to an individual's network of friends, family, colleagues, coworkers, and potentially the subsequent connections within those networks. A social network, for example, can be utilized to find more relevant connections for a variety of activities, including, but not limited to dating, job networking, receiving or providing service referrals, content sharing, creating new associations or maintaining existing associations with like-minded individuals, finding activity partners, performing or supporting commercial transactions, or the like.

An online social network refers to a person's set of direct and/or indirect personal relationships, including real and virtual privileges and permissions that users may associate with these people. Direct personal relationships refers to relationships with people the user communicates with directly, including family members, friends, colleagues, coworkers, and other people with which the person has had some form of direct contact, such as contact in person, by telephone, by email, by instant message, by letter, or the like. These direct personal relationships are sometimes referred to as first-degree relationships. First-degree relationships can have varying degrees of closeness, trust, and other characteristics.

Indirect personal relationships refer to relationships through first-degree relationships to people with whom a person has not had some form of direct or limited direct contact, such as in being cc'd on an email message, or the like. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as two degrees of separation or a second-degree relationship. Similarly, a friend of a friend of a friend can be characterized as three degrees of separation or a third-degree relationship, and so forth.

A social network generally includes individuals with similar experiences, opinions, education levels and/or background, or is organized into subgroups according user profile, where for example a member can belong to multiple subgroups (profession—engineer, hobby—photography, geographic location—Northern California). For social searches or inquiries, a person's first-degree social network can be a great source of information. The reason is that the direct relationship with the individuals is likely to lead to more relevant information, more forthcoming and complete responses and responses from individuals with similar experience, opinions, education levels, background, and so on.

Social networks can be structured, or supported by mechanisms or organizations such as social network services that can govern interactions within the social network, membership of the social network, and use of resources within the network, as well as flow of information across boundaries of the network. For example, a social network can be a "walled garden", where members or other designated persons can enter the garden and the "wall" can have various levels of porosity, transparency and security. Example social network services can include software operating on hardware to enable, support and implement social networks. Networks or services that host content in connection with individual user accounts and permit access to the hosted content to members and guests of the network according to various conditions are also variants of social network services. A mobile device that includes contact and other information for different people, for example names, telephone numbers, email or other electronic addresses, pictures and so forth, can also facilitate a social network or represent a social network service.

A social search or inquiry (e.g., a search for any type of information within a social network, for example "best restaurants in a particular location?") can obtain more meaningful results if directed to target contacts within a social network or across social networks, contacts who have specific knowledge and/or concerns or preferences similar to those of the searcher. Information obtained by such searches can be captured and retained by the user in a knowledge base (e.g. an "FAQ" or Frequently Asked Questions compilation or other mechanism or data store), or for example alternatively or additionally can be maintained by a social network service, and can be a resource that is shared with other social networks. For example, the social network service can receive the knowledge base, or can capture and store the information by monitoring communications within the network. Access to the knowledge base can be controlled by a particular user or group of users (e.g. aggregate or average permissions, or by most restrictive permission of any member of the group, and so forth), or additionally or alternatively by the hosting social network. Permissions to access the knowledge base can, for example, be based at least partly on degrees of separation between the particular users who created or own the knowledge base, and users desiring to access the knowledge base. The restriction can permit access to only those whose degree of separation is less than a threshold value, or only to those whose degree of separate is greater than a threshold value. Particular individuals or groups of individuals or particular social networks can enabled with access, or can be blocked from access.

The following briefly describes the embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

In an example embodiment, mechanisms are provided to enable information sharing and collaboration between different social networks, for example social networks implemented via social network services. In an example embodiment, a Social Network Services Database and a Social Network Authenticator are implemented on one or more servers or networks and are accessible via a web page. The Social Network Services Database and the Social Network Authenticator can be implemented on the same server or network, or in different servers or networks. The Social Network Authenticator provides or enables single-sign-on (SSO) authentication of individual users or other entities (e.g., social networks), for example that desire access to network resources. For example, when an individual user contacts a social network service, the social network service can receive identification information from the user and then pass the information to the Social Network Authenticator, which authenticates the individual user and then sends results of the authentication to the social network service. At that point the social network service provides access and services to the individual user based on the authentication and on terms between the individual user and the social network service or the social network it represents. The terms can include, for example, whether the authenticated individual user is a member of the social network, a guest of the social network or of one of the social network's members, and so forth.

Social network services contact the Social Network Authenticator for SSO authentication, and can contact the Social Network Services Database to receive different services. The contact can be made or initiated by or through a server or other entity that represents a given social network service. In example embodiments the Social Network Services Database provides catalog services that indicate resources on participating social networks or social network services and conditions under which each participating social network or social network service will allow other entities (e.g., other social networks or services acting on behalf of one or more individual users) to access those resources. Example resources include lists of network users and their membership status in one or more networks (Guest, Member, Senior Member, and so forth) as well information from or relating to their profiles, interests and data stored or linked to a user or a group of users in a given social network. Example resources can also include structural or other information about the network, for example numbers of users, names of different subgroups within the social network, general demographic information, and so forth. In an example embodiment, resource listings maintained by the Social Network Services Database also indicate restrictions or conditions that a social network hosting a resource can apply or enforce before permitting another entity (such as an other social network or user from another social network) to access or use the resource.

An additional mechanism or service provided by the Social Network Services Database is tracking of information transfer between different social networks or social network services for monetization purposes, and tracking of activities of a particular individual user across or through different social networks, for example via sessions associated with the user and corresponding session records that store information regarding the user's activities. This tracking can, for example, enable the individual user to efficiently access multiple social networks, and take or cause actions that affect multiple social networks. Interactions between social networks or between social network services can also be tracked via sessions. Session data can be updated, for example, when the Social Network Services Database receives authentication of a user or otherwise receives information from a social network or service or representative thereof.

In example embodiments two sets of Application Program Interfaces (APIs) are used, one set for social network services, and one set for the Social Network Services Database and the Social Network Authenticator, to enable them all to communicate with each other. In example embodiments the APIs support authentication (e.g., a social network service asks the Social Network Authenticator, directly or through the Social Network Services Database, to authenticate an individual user or other entity such as another social network service), and also searching of network resource catalogs or Access Control Listings (ACLs) on the Social Network Services Database. The APIs also include APIs to support inquiries and exchange or transfer of resources between social networks or social network services.

Other services or functions variously supported by the API's include establishing, maintaining, and closing sessions that are maintained for example by the Social Network Services Database. A session can track a user's interactions with one or more social networks over a time period and can store related data, for example so that actions or projects that span multiple social networks can be efficiently supported and executed. In example embodiments a session is created when a user is first authenticated, and is closed and optionally discarded upon expiration of a predetermined time period, for example a period of time since the session was created, or a period of time after a last interaction of the user with one or more social networks identified in the session record. Thus a session can function to support a "global shopping cart" in a situation where a user initiates purchases of products from multiple, different networks, and then concludes (e.g., pays for the purchased products or services) all the purchases in a single event or via a single mechanism.

Other services and functions variously supported by the APIs include maintaining and administering network resource listings such as Access Control Lists (ACLs) hosted and maintained by the Social Network Services Database, caching to enhance the speed or other quality of a user's experience involving one or more social networks, and monetizing exchanges or interactions between different social networks, e.g. via corresponding social network services.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, client devices 101-104, Social Network Service servers 106, 107, Social Network Services Database 109, and Social Network Authenticator 111.

Generally, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. One embodiment of a mobile device usable as one of client devices 102-104 is described in more detail below in conjunction with FIG. 2.

Client device 101 may include virtually any computing device that typically connects using a wired communications medium such as personal computers, multiprocessor systems, microprocessor-based or programmable consumer electronics, network PCs, or the like. In one embodiment, client devices 101-104 may be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), extensible Markup Language (XML), or the like, to display and send a message.

Client devices 101-104 also may include at least one other client application that is configured to receive content from another computing device. The client application may include a capability to provide and receive textual content multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), network address, or other device identifier. The information may also indicate a content format that the client device is enabled to employ. Such information may be provided in a message, or the like, sent to another computing device.

Client devices 101-104 may also be configured to communicate a message, such as through email, Short Message Service (SMS), Multimedia Message Service (MMS), instant messaging (IM), Internet relay chat (IRC), Mardam-Bey's IRC (mIRC), Jabber, or the like, between another computing device. However, the present invention is not limited to these message protocols, and virtually any other message protocol may be employed.

Client devices 101-104 may further be configured to include a client application that enables the user to log into a user account that may be managed by another computing device or network, such as a social network or other resource accessible through a corresponding social network service, e.g., via one of the Social Network Service servers 106, 107. Such a user account, for example, may be configured to enable the user to receive emails, send/receive IM messages, SMS messages, access selected web pages, participate in a social networking activity, provide messages that may include links or attachments, or the like. However, managing of messages may also be performed without logging into the user account.

A message may be sent using any of a variety of message protocols, including but not limited to SMS, IM, MMS, email, or the like. The recipient of message has the option of responding to the message either by addressing the response to only the sender, addressing the response to all of the recipients along with the sender or selecting particular recipients. The recipient can also forward the email onto others, either directly or through the auspices of a social network service, for example Yahoo 360 or Facebook or the like. The forwarded message may include a reference to the content, article, or message using, for example, an attachment, a link, a copy of the content, article, or message within the forwarded message, or virtually any other mechanism.

A user's social network can include many different groups, within or without the sphere or influence of a social network service. For instance, an initial social network can be any contact within the person's email address book. The address book can be located on the user's mobile device or personal computer, and/or can be hosted and maintained by a server such as a server in or accessed by a social network service. A person's social network can also include various groups, for instance the individual's contacts can be grouped into work-related contacts, school-related contacts, social contacts, sub-groups within one or more social networks, and the like. The addresses for these social contacts can be saved within memory in client devices 101-104 or can reside elsewhere within wide area network/local area network 105 or wireless network 110 or on various servers connected to these networks, for example those of one or more social networks (and/or corresponding social network services) of which the user is a member.

In one embodiment a recipient of a social search or other request to share information from another user on a different social network, can have his or her own social network contacts that are also accessible according to predetermined permission levels of the recipient and/or the contacts. If the permission level is granted, or rather conditions applied by the recipient and/or his social network (e.g. via a corresponding social network service) are met by the different social network or the requesting user, the request can be forwarded to each of the social contacts within the recipient's social network. This can enhance value of information that the requesting user receives in reply, because the information can include multiple responses from like-minded individuals, e.g., from individuals with similar education levels, age, socio-economic status or the like, which can collectively provide a more complete and reliable answer than if fewer responses were received. In one embodiment, the responses from the recipient's social network may be added to the requesting user's knowledge base or otherwise associated with the requesting user's profile in the different social network, as well as to the recipient's knowledge base or profile.

The contacts within a user's social network can be categorized with different attributes, and this categorization can be a resource of the social network. The attributes can indicate expertise or interest in particular areas, such as new consumer technologies or music. Attributes can also be negative or indicate absence of interest or expertise, for example different personal preferences of a user or contact or a user or contact's lack of knowledge in particular areas. Thus, one embodiment takes advantage of the particular areas of expertise that may be discerned or targeted within a social network, and that can be offered as specific resources for use or access by other users such as individual users or other social networks. For example, knowledge and use of these attributes can enable a user to obtain more relevant information in a more timely manner by the ranking and categorizing of responses to a social request according to these different attributes.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, or the like. Access technologies such as 2G, 3G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple the Social Network Service servers 106, 107 and also the Social Network Services Database 109 and Social Network Authenticator 111 with each other and with other computing devices, including client device 101, and through wireless network 110 to client devices 102-104. For example, an individual user can use one of the devices 101-105 to contact one or more of the servers 106-107, and that server can in turn contact other ones of the servers 106-107 and the Social Network Services Database 109 and/or the Social Network Authenticator 111 based on communications with the individual user. The servers 106, 107 can each represent a different social network service, for example that represents a different social network. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as twisted pair, coaxial cable, fiber optics, wave guides, and other wired media and wireless media such as acoustic, RF, infrared, and other wireless media.

An example embodiment of the Social Network Service servers 106, 107 and the Social Network Services Database server 109 and the Social Network Authenticator 111 is described in more detail below in conjunction with FIG. 3. Generally, however, the servers 106, 107 may include any computing device capable of connecting to network 105 to enable managing of communication with, and within, a social network, and can for example represent or be part of a social network service that implements or enables the social network. In one embodiment the servers 106, 107 connect to and can represent (or control access to) different social networks or social network services, and provide one or more interfaces to a user of client devices 101-104. These interfaces may be used to post, spread, delete, or otherwise manage communication with, and distribution of messages or communication within, the social networks of the servers 106, 107. For example, the servers 106-107 and optionally 109, 111 may each include an interface that may request information from a user of client devices 101-104. For example, these servers may provide access to an account with a social network or social network service or other account, and may request user log-in information before providing access to the account. Such log-in information may include a user name, password, or other identifier of the user and/or client device used by the user, and in example embodiments some or all of the log-in information is provided to the Social Network Authenticator server 111 to perform authentication services. Moreover, the servers 106, 107, 109, 111 can be variously configured to manage information for a user, such as an address book, buddy list, or other type of contact list, either in conjunction with a social network or social network service, or independently.

More specifically, the Social Network Service servers 106-107 can represent or be part of different networks, for example different social networks that are enabled or structured by the social network services. Thus the servers 106-107 can receive log-in requests from users for resources on the respective social network of the server 106, 107. The users can be individual users, or other networks that seek to access resources of the social network and/or share resources with the social network. A Social Network Service server (106-107) can also receive requests from a user for resources on other networks, in particular other social networks. The Social Network Service servers 106-107 can work together with the Social Network Services Database server 109 to perform or provide these functions and services. For example, a social network service that receives a request from a user can submit information about the user to the Social Network Services Database server 109 and ask the server 109 to authenticate the user (for example by contacting the Social Network Authenticator 111), or can submit the information directly to the Social Network Authenticator 111. The Social Network Service servers 106-107 can also ask the Social Network Services Database server 109, what resources might be available on other social networks and/or through other social network services, and what conditions or restrictions for accessing those resources might be. Thus, the servers 106, 107, 111 can rely on the Social Network Services Database server 109 to help find resources across networks, and help facilitate communications with other networks or entities by supporting SSO (Single Sign-On) authentication.

The Social Network Authenticator 111 and optionally the Social Network Services Database server 109 can store identification information regarding specific, individual users in order to support SSO authentication of those users. The Social Network Services Database server 109 can also store information regarding resources on different social networks including conditions for accessing those resources from outside the social networks that host those resources. This resource information can form a directory or catalog of resources (e.g., Access Control Lists) of different social networks, that other social networks (and users of social networks) can query to discern which other social networks might provide or share information across social network borders. The Social Network Services Database server 109 can also store session information, e.g. information that can track activities of a user across multiple social networks and/or social network services, and can track interactions between social networks and/or social network services. Sessions can be established when a social network or social network service first contacts the Social Network Services Database server 109 on behalf of a particular individual user, and/or when a social network or social network service contacts the server 109 for a particular purpose. The Social Network Services Database server 109 in an example embodiment contains identification information regarding individual users and can contain identification information regarding different social networks, so that these entities can be authenticated by the Social Network Authenticator 111 and/or the Social Network Services Database server 109. As described more fully elsewhere herein (e.g. in the Generalized Operation section), the server 109 can include directories or databases (e.g., Access Control Lists) that indicate different resources of different networks, and that can indicate conditions or restrictions under which those networks will share or permit access to those resources. Such information, and also session information, can be stored within the server 109, and/or can be stored or backed up to other data storage that is accessible to the server 109. Thus the information for which the server 109 is responsible may also be stored in a distributed platform accessible via different methods, such as HTTP or TCP proxy interfaces, and can be duplicated in different locations, and may be indexed or archived for reference.

More particularly, the Social Network Authenticator 111 (and optionally the Social Network Services Database server 109) provides single-sign-on (SSO) authentication services via Microsoft Cardspace™, OpenID, or any other appropriate mechanism or protocol that supports a third party (e.g. the Service Provider) authenticating a first party (e.g. an individual user, or another social network or social network service) at the request of a second party (e.g. a social network service). Thus in an embodiment the Social Network Authenticator 111 (and/or optionally the Social Network Services Database server 109) hosts data concerning authentication, and can contain identification data regarding individual users and, optionally, participating social networks and other entities so that it can authenticate them upon request, such as a request from a Social Network Service server 106-107. In an example embodiment, the second party contacts the third party directly. In another embodiment, the third party receives the request from the second party indirectly through one or more intermediaries. For example, a social network service can send to the Social Network Services Database server 109 a request to authenticate a first party, and the server 109 can pass the request to the Social Network Authenticator 111, which can perform the authentication and then send the authentication results directly to the requesting social network service, or can send the authentication results to the server 109 which can then relay the results to the requesting social network service. In an embodiment, the Social Network Authenticator 111 can send the results directly to both the Social Network Services Database server 109 and the requesting social network service. Thus after a Social Network Service server (106-107) receives an authentication result from the server 109 and/or the server 111, the Social Network Service server can respond appropriately to whatever caused it to make the authentication request, for example to provide access and services to the authenticated user based on the authentication and on terms between the user and the social network and/or the social network service. The terms can include, for example, whether the authenticated individual user is a member of the social network, a guest of the social network, is a recognized companion or peer social network or social network service, and so forth.

The Social Network Services Database server 109 can host data concerning caching, monetization, sessions, and ACLs, and can also support searches by the Social Network Service servers 106-107, by maintaining listings of resources available in different networks, and receiving and responding to requests from the servers 106-107 to search the listings. Such searches received from Social Network Service servers (106-107) or other entities can be specific or global. For example, searches can be for certain resources on certain social networks or subsets of a particular social network, for a certain resource on any available or identifiable social network, for all resources on particular social networks, and so forth. Search results can, for example, identify resources that are available, and indicate where they are available and under what conditions.

Social network resources that the Social Network Services Database server 109 can catalog or maintain listings for can include, for example, a user's profile and any portion thereof or related information, for example one or more of a user's real name, social network nickname or online moniker, an icon or image associated with the user, contact information for the user (telephone numbers, email addresses, mailing addresses and so forth), geographic location or address information, and multimedia information associated with the user. For example, the multimedia information can include a resume, a written introduction or statement, sound clips, movie clips, pictures (of the user, the user's friends, family, favorite places, etc.), PowerPoint™ presentations relating to the business or interests of the user, and so forth. Other examples of network resources include a web page, a widget or software application resident on a page, and other data elements. Network resources can also include aggregate or collective data, for example data pertaining to multiple users or members of a social network, such as lists of participants on a social network and related information such as their different membership status, logged-in status, activities or calendars, interests, groupings of users within the social network, general and specific demographic information of participants on the social network, and so forth. Network resources can also include listings of products or services available on or through the network and conditions on availability (e.g. free, restricted to specific users or classes of users or neighbor social networks, available for purchase, and so forth).

In an example embodiment, resource listings that the Social Network Services Database server 109 maintains for a given social network (e.g. a social network enabled or administered via a social network service) can include resources that are at a higher level than individual users, for example can include different classes of users, different forums, and so forth, and not include listings or individual permissions/roles for specific users and their specific information. For example, individual user profiles and other data belonging to or associated directly with a specific user can be omitted from resource listings maintained by the server 109. In that embodiment, information and permissions specific to a particular user on a social network can be ascertained and potentially accessed (depending on corresponding permissions and associated conditions) by directly inquiring with the social network having the resource(s) corresponding to that user. For example, where information is not available in resource listings administered by the server 109, a first social network (via, e.g., a Social Network Service server 106, 107 or other representative of the first social network) can send an inquiry directly to a second social network or social network service that hosts the desired resource(s) (and the second social network or social network service could contact the server 111 and/or the server 109 to request authentication of the inquiry), to discover permissions or conditions that the second social network or social network service would require to permit the first social network or social network service to access or even confirm existence of the desired resource.

In an example embodiment, resource listings (e.g., Access Control Listings or ACLs) maintained by the Social Network Services Database server 109 reflect access restrictions that are enforced by the respective social networks that have the listed resources or corresponding social network services. These networks can provide information to the server 109 to update relevant resource listings (e.g., via corresponding social network services or other mechanisms), and the server 109 can additionally or alternatively poll social networks or social network services to ask for ACL updates, and so forth. For example, a Social Network Services Database can respond to complaints from a first social network or social network service that another social network (or social network service) does not in fact provide resource access that matches conditions reported by the Social Network Services Database. In response, the Social Network Services Database can flag the corresponding ACL to indicate it should be verified or updated and/or flagged as questionable. Levels of detail in the ACLs maintained by the Social Network Services Database can vary according practical considerations or details of particular implementations.

In an example embodiment, each participating social network and/or social network service can select ones of its resources to be listed in ACLs maintained by the Social Network Services Database server 109, and can set or specify permissions or conditions for access associated with each listed resource. In example embodiments, conditional access to resources is enforced by the network that hosts the resources, for example via the Social Network Service servers 106-107. ACLs maintained by the Social Network Services Database server 109 can contain all details regarding resource inventory of a network and corresponding access conditions/permissions, or can contain any lesser amount of details. Details not found in the ACLs or provided by the Service Provider can be inquired after by contacting the network directly, for example using provided APIs. Thus, ACLs maintained by the Service Provider can function as an index or catalog of resources across different social networks, identifying specific resources or classes or resources, networks on which they may be found, and corresponding access conditions or rules, e.g., whom the network hosting the resource and/or a corresponding social network service is willing to share with, and under what conditions.

In an example embodiment, conditions associated with accessing network resources can be implemented using "roles" to organize users into different groups and permit different levels of access to a resource depending on the group. For example, roles can include "guest", "member", "administrator", "business user", and so forth, and can also include or indicate to which social network(s) an entity with a role belongs. For example, a role might be "Yahoo/guest" or "MySpace/member". ACLs for a social network service MySpace, stored in or accessible via the Social Network Services Database server 109 might indicate that MySpace would permit Yahoo members to access activity summaries of MySpace themed forums (e.g. message boards for particular groups or interests) and view profiles of logged-in participants on those forums, but would only permit Yahoo guests to view the names of the MySpace themed forums. In an example embodiment, permissions can also depend on existing relationships between different participants on different social networks. For example, where a MySpace member with a particular level of service (e.g., a premium level) designates specific Yahoo members as friends or acquaintances (in essence provides a referral) those Yahoo members can be provided with access to MySpace resources. Conditions can vary, for example the access can be for a limited period of time, can be for general MySpace resources, for MySpace resources specifically identified by or related to or controlled by the referring MySpace member, and so forth. Thus, each resource can have multiple levels of access associated with it, and can have multiple entities or classes of entities associated with a given level of access for the resource. Global access, for example, can permit access to all social networks that are not specifically excluded. For convenience in definition and creation, roles used to label resources listed in the ACLs can have a hierarchical structure so that a child role can inherit the attributes of a parent role, for example where a guest has fewer privileges than a member, Guest role can be a parent of Member role so that the Member role inherits all privileges of the Guest role.

Another service or function provided by example embodiments of the Social Network Services Database server 109 is that of establishing, maintaining, and closing sessions, where a session tracks a user's interactions with one or more social networks (e.g. through social network services) over a time period. A session can store relating to the user's activities, for example so that actions or projects that span multiple social networks can be efficiently supported and executed, including monetization. In example embodiments the server 109 creates a session when a user is first authenticated (if there is no current or pre-existing session), and closes and optionally discards the session upon expiration of a predetermined time period. For example, a session can be closed upon expiration of a time interval after a last interaction of the user with one or more social networks identified in the session record. In addition, the Social Network Service servers 106-107 can send updates regarding activity of the individual user to the Social Network Services Database server 109, so that the Social Network Services Database server 109 can update a session record for the individual user. A session can function to support a "global shopping cart" in a situation where a user initiates purchases of products from multiple, different networks, and then concludes (e.g., pays for the purchased products or services) all the purchases in a single event or mechanism.

Session records maintained by the Social Network Services Database 109 can also support various monetization methods between individual users and networks or between different social networks (and/or corresponding social network services) that share resources. Monetization models or methods can include but are not limited to pay-per-use, pay-per-contact, and pay-per-session. These can be tracked with respect to actions of individual users, and the users can bear the costs of monetized actions, or individual users can share costs with one or more social networks, or the social networks can bear the costs entirely. For example, where actions of individual users incur cost but related actions of the users generate revenue for a network or social network service, the network or service can bear the incurred cost. Social networks can also share resources directly (e.g. via corresponding social network services) and in accordance with conditions or terms that require one or more of the networks or services to compensate an other network or service via monetary payment or other compensation. Such arrangements can be organized and structured in many different ways. For example, where social networks share resources, monetization can be based on a "balance of trade". For example, where two social networks share resources and one network uses more than the other so there is an imbalance, the amount of the imbalance can be a basis for payment or other compensation from one network (and/or social network service) to the other.

The Social Network Services Database server 109 can also support caching to enhance the speed or other quality of a user's experience involving one or more social networks and/or social network services, for example by storing content that is common to a user's purpose or activity as the user interacts with different social networks or ones of the Social Network Service servers 106-107. Cached information can for example be associated with or accessible via a session that refers to the user is maintained by the server 109.

Although FIG. 1 illustrates only one Social Network Services Database server 109, in an example embodiment there are multiple Social Network Services Database servers hosting different ACLs and other information, where for example different Social Network Services Database servers serve different geographical regions or languages, different groups of different social networks, and so forth. In an example embodiment, the different Social Network Services Database servers can contact each other to confirm boundaries, partitions and different responsibilities, for example so that a Service Provider can refer a request to a different, more appropriate Social Network Services Database server, and/or reply to a request with a suggestion to contact a different Social Network Services Database server. In an example embodiment, a user's first inquiry to a social network or social network service, can include identification information of the user that the social network and/or social network service will need in order to request authentication of the user and also an indication of which Social Network Services Database server the network should contact to request authentication of the user. In this case the user can be an individual user, or can be another social network or social network service, acting for example on its own initiative or in response to a request or other action of an individual user.

In an example embodiment, the server 109 is a Social Network Service server like the servers 106, 107 except that it takes on additional responsibilities of providing a resource directory, and session services. In an example embodiment, the server 111 is a Social Network Service server like the servers 106, 107 except that it takes on additional responsibilities of providing authentication services.

In example embodiments, different social networks exchange information via Social Network Service servers 106-107, with help from the Social Network Services Database server 109, in response to requests from individual users. For example, an individual user on a first social network might want to access his or her profile on another social network, for example to correlate the user's profiles on the two networks, to import or export specific profile items or items associated with the user's profile from one network to the other. An individual user might also want to expand his contacts with other users and thus might ask his social network (or corresponding social network service) to inquire with another social network or social network service to help identify potential contacts and/or realize specific contacts with users in the other network, or identify and retrieve other kinds of information from the other network (knowledge base information, media such as sound clips, movies or photographs, listings of interest-focused user groups or subgroups, and so forth).

In example embodiments, entities other than individual network users can instigate or launch exchange of information between social networks. For example, a social network or corresponding Social Network Service server 106, 107 can initiate communication with other networks via the corresponding servers 106-107, and can initiate communication with the Social Network Services Database server 109. For example, a first social network or social network service might want to share or purchase information and/or services from another social network or social network service, to enhance experience of users in the first social network or increase membership on the first social network or even to police membership on the first social network (e.g., blacklist known sexual predators or spammers). For example, a social network and/or social network service can initiate information transfer or exchange with another social network or its corresponding social network service, for a variety of reasons and under different circumstances, including for example a unilateral decision made by an owner of the social network or social network service, a change of a condition or status within the social network, in accordance with mutual agreements between different social networks and/or social network services, periodically in accordance with existing permissions, and so forth. For example, a social network service that monitors collective trends of its members or users (e.g. numbers or proportions of requests for certain kinds of information, shifts in kinds or amounts of content associated with a user's profile or account, and/or other user activity) can initiate contact and exchange with other social networks or social network services based on those trends, through the Social Network Service servers 106-107 and the Social Network Services Database server 109.

It should be noted that in example embodiments, the client devices 101-104 may also be configured with client applications and with APIs and can be configured and arranged to enable the client device to manage communications within and/or between social networks and/or social network services, so that one or more of the client devices 101-104 can variously take on some or all of the functions and responsibilities described with respect to the servers 106, 107, 109, 111. Moreover, in another embodiment the various functions performed by the servers 106, 107, 109, 111 may be distributed across a plurality of network devices or client devices.

Devices that can operate as one or more of the servers 106, 107, 109, 111 may include, but are not limited to personal computers, desktop computers, multiprocessor systems, microprocessor-based or programmable consumer electronics, network PCs, servers, network appliances, and the like.

Moreover, while the servers 106-111 are illustrated as distinct devices, the invention is not so limited. For example, in one embodiment, two or more of the servers 106-111 may be variously implemented within a single network device, or distributed across a plurality of network devices.

The servers 106-111 can include virtually any network computing device that is configured to provide various resources, including content and/or services over network 105. One or more of the servers 106-111 may provide access to any of a variety of content including, but not limited to messages, such as emails, SMS messages, IM messages; search results; news; articles; websites; hyperlinks; ads; reviews; as well as content that may include audio files, video files, text files, streaming files, graphical files, or the like. Thus, virtually any content may be available through servers 106-111 (subject to applicable access conditions or restrictions) for access by client devices 101-104. In one embodiment, the Social Network Service servers 106-107 might be configured and arranged to provide a website for users to post, view, link to, and/or otherwise access, content. Servers 106-107 might also provide FTP services, APIs, web services, database services, or the like, to enable users (e.g. authenticated individual users or authenticated networks) to access content. In addition, one or more of the servers 106-107 may also provide a messaging service, such as an email server, text messaging server, or the like. However, the servers 106-111 are not limited to these mechanisms, and/or content, and others are envisaged as well.

Although in example embodiments an individual user would not contact the Social Network Services Database server 109 and/or the Social Network Authenticator 111 directly but instead via inquiries or requests through one of the Social Network Service servers 106, 107, in other embodiments an individual user can contact one or more of the servers 109, 111 directly, for example to update a user's identification information that is used during authentication. In another case where a social network effectively has one member or user who is willing to share resources with other social networks or users, the individual user can function as or directly control a Social Network Service server to exchange information with the Social Network Services Database server 109, for example to provide resource listings and permissions/access conditions, session information including activity and monetization information, and so forth.

Illustrative Client Environment

Figure 2:
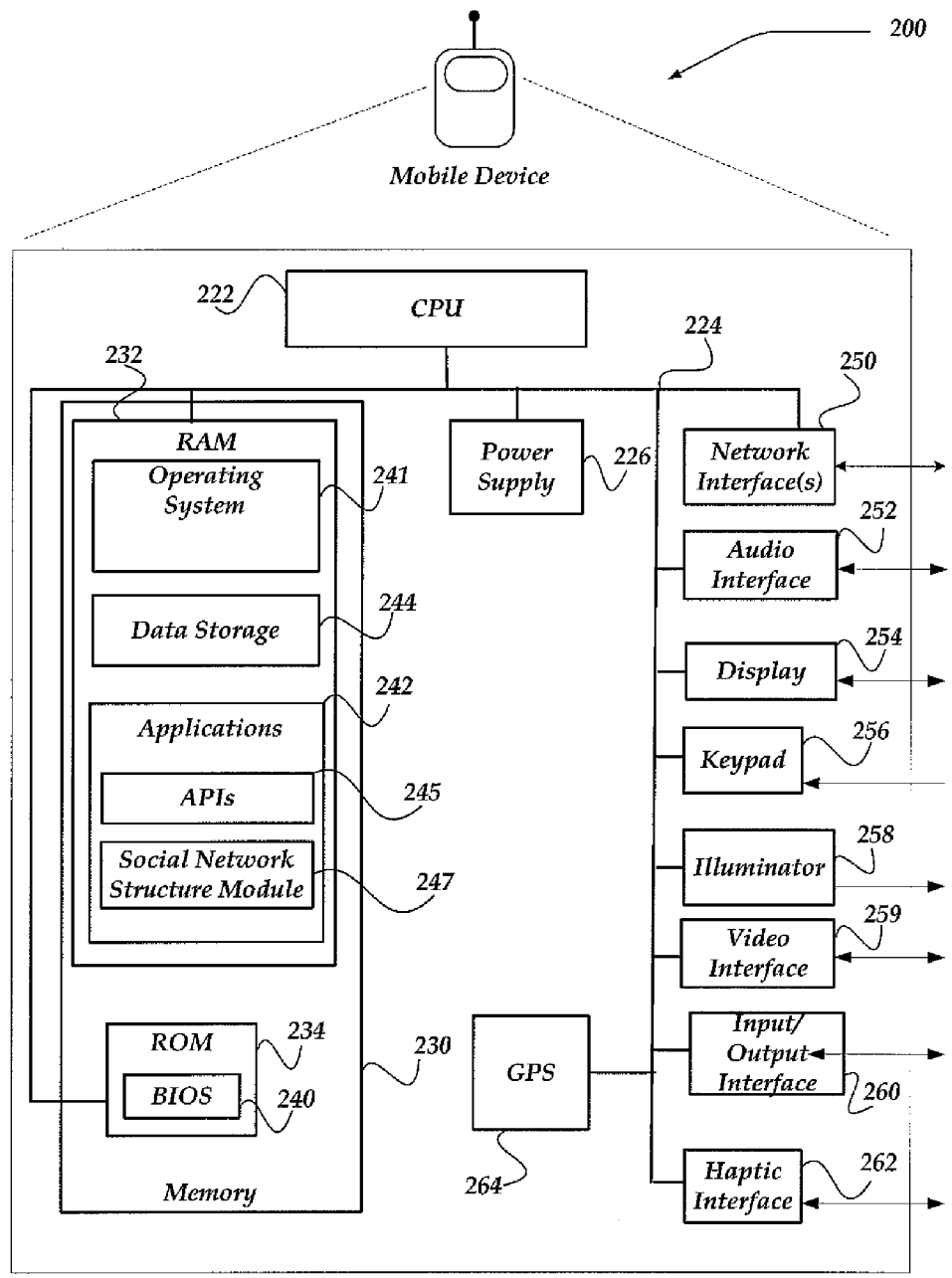
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, one of client devices 102-104 of FIG. 1.

As shown in FIG. 1, mobile device 200 includes a processing unit (CPU) 222 in communication with a mass memory 230 via a bus 224. Mobile device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

In one aspect of the invention, the physical location of the mobile device can be used as an aspect implementing communications, for example selecting which of the Social Network Service servers 106-107 the mobile device might initiate communications with, and where multiple Social Network Services Databases (109) or Authenticators (111) are provided (e.g. for authentication purposes), which of them is to be contacted for authentication or other services on behalf of a user of the mobile device.

Mass memory 230 includes a RAM 232, a ROM 234, and other storage means. Mass memory 230 illustrates another example of computer readable storage media for storage of information such as computer readable instructions, data structures, program modules, or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, the Symbian® operating system, or Y! GO. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200. The information may then be provided to another device based on any of a variety of events, including being sent as part of a header during a communication, sent upon request, or the like. Moreover, data storage 244 may also be employed to store personal information including but not limited to address lists, contact lists, personal preferences, or the like. Data storage 244 may also include profile information. At least a portion of the information may also be stored on a disk drive or other storage medium (not shown) within mobile device 200.

Applications 242 may include computer executable instructions which, when executed by mobile device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. These applications variously enable the mobile device 200 to communicate with networks, websites and other devices, for example any of the Social Network Service servers 106-107.

The application programs can also include one or more of the APIs mentioned elsewhere herein, that for example support communications between social networks, authentication, and so forth. The APIs can be included for example within a browser application on the mobile device 200, for example via a downloadable plug-in, script, applet, widget, or the like, that is configured and arranged to manage communications between the user and the user's social network. The APIs can be used for example in embodiments where the mobile device 200 functions as a social network or node thereof such as a Social Network Service server 106-107. In an example embodiment the APIs can enable the mobile device 200 to perform functions of a Social Network Services Database server such as those described with respect to the server 109 and below in the Generalized Operation section, and in that case the mobile device 200 would also include corresponding applications and data or links to databases to variously support resource directory, authentication, and session services (not shown in FIG. 2).

The mobile device 200 can also include a social network structure module 247, which can enable the mobile device to act as a part of a social network or social network service (e.g. perform various functions of the servers 106-107), for example by enabling the mobile device 200 to receive and respond to requests from various users for access to resources of a social network, and to enforce restrictions and permissions for accessing those resources within the social network.

The module 247 can also include a browser application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), extensible Markup Language (XML), and the like, to display and send a message. However, any of a variety of other web based languages may be employed. The module 247 may further be configured as a messenger application that is configured to send, to receive, and/or to otherwise process messages using SMS, MMS, IM, email, VOIP, and/or any of a variety of other messaging communication protocols. Although a single module 247 is illustrated it should be clear that multiple applications may be employed. For example, one module 247 may be configured to manage SMS messages, where another application may manage IM messages, and yet another messaging client is configured to manage emails, or the like.

Illustrative Network Device Environment

Figure 3:
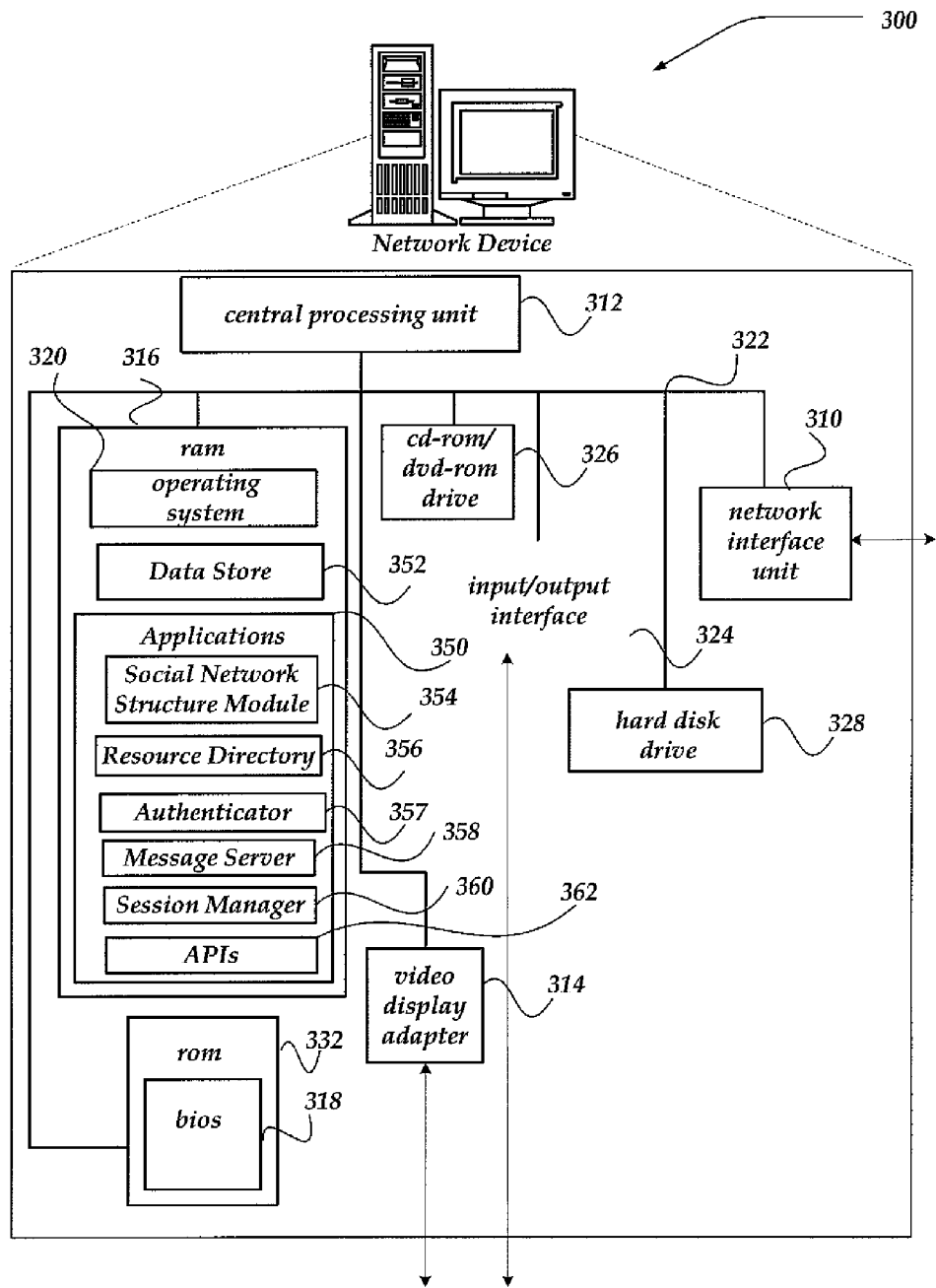
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, one or more of the servers 106-111 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer readable storage media. Computer readable storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD), Blu-ray disks or other optical storage, magnetic cassettes, magnetic tape, magnetic floppy disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth.

Applications 350 may include a social network structure module 354, a resource directory 456, an authenticator module 357, a message server 358, a session manager 360, and APIs 362. These applications can be variously based in the network device, in the mobile device, or in a distributed network. Thus, the invention may be implemented in a traditional client server arrangement, in a peer to peer network or any other architecture. Alternatively, the invention may be implemented as a software client run on currently existing platforms. A widget or messenger plug in could implement the applications, wherein the applications are defined only within the application layer. The mass memory can also store information to support the applications 350, the user's knowledge base within data storage 352, and/or cd-rom/dvd-rom drive 326, hard disk drive 328, or other computer readable storage medium (not shown).

In particular, the social network structure module 354 enables the network device to act as a part of a social network or a social network service, for example to communicate with users or devices that desire to log-in to a social network (e.g. via a social network service), to receive and respond to requests from various users for access to resources of the social network, to enforce restrictions and permissions for accessing those resources within a social network. The module 354 can enable the network device 300 to generally support and implement the social network.

The resource directory 356 can include a listing of resources within the social network of which the network device 300 is a part or represents or helps implement. In an embodiment where the network device 300 is configured as a Social Network Services Database server such as the server 109 of FIG. 1, the resource directory 356 can include listings (e.g., Access Control Listings) of resources of various different social networks such as social networks enabled by social network services, and can also indicate conditions or requirements under which the respective social network would permit other social networks or entities to access or share those resources, and can indicate what kinds of information or resources that network would be willing to receive from other social networks or entities, on either a long term or a short term basis. An example situation where a short term basis might apply, would be where a network temporarily assists another network that has a high load or demand on its infrastructure or selected resources.

The authenticator module 357 can for example be included or used when the network device 300 is configured as the Social Network Authenticator 111 of FIG. 1 or the Social Network Services Database server such as the server 109 of FIG. 1, and can support SSO (Single Sign On) authentication services, for example where a Social Network Service server 106, 107 submits an authentication request and related information regarding a user such as an individual user or an other network that has contacted the Social Network Service server, so that the server 111 or 109 can authenticate the user and provide authentication results back to the requesting server 106, 107.

Message server 358 can field messages from other entities such as individual users or other networks or servers, and may include virtually any computing component or components configured and arranged to forward messages from message user agents, and/or other message servers, or to deliver messages to a local message store, such as data store 352, or the like. Thus, message server 358 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like. However, message server 358 is not constrained to email messages, and other messaging protocols may also be managed by one or more components of message server 358. Thus, message server 358 may also be configured to manage SMS messages, IM, MMS, IRC, mIRC, or any of a variety of other message types. Moreover message server 358 may also represent a web server configured to enable access to and/or management of messages. The message server 358 can communicate appropriately with the other applications, for example the applications 354-357 and 360-362, for example to exchange messages or information, to present or work in coordination with the APIs 362, and so forth.

The session manager 360 can track communications and interactions between the network device 300 and other users or devices. Where the network device 300 is configured as a Social Network Services Database server such as the server 109 of FIG. 1, the session manager enables generation and updating of sessions, that for example track activities of given users (individuals users, networks, or other entities) across multiple different social networks such as social networks enabled and/or administered by different social network services. This tracked information can also be used implement monetization mechanisms of various kinds, that for example rely on records of information flow or exchange between different users and/or networks.

The APIs (Application Program Interfaces) 362 implement or support communications among the servers 106-111 of FIG. 1, and can be variously incorporated within or used in conjunction with the message server 358, web pages, and other interface or information exchange mechanisms. As noted herein, the APIs can promote or enable standard forms of communication between different network devices 300 that are variously configured as one or more of the Social Network Service servers 106-107, Social Network Services Database 109 and Social Network Authenticator 111. The APIs can be provided in two sets, one set for servers 106-107 and one set for the servers 109, 111, to variously allow the servers to communicate with each other. In an embodiment, both sets can be provided on the same network device.

In particular, the APIs support authentication (e.g., a Social Network Service server asks the Social Network Authenticator or the Social Network Services Database to authenticate an individual user or other entity such as another social network or social network service). The APIs also include APIs to support searching, for example for network resources of various kinds, by inquiry to networks such as social networks (e.g. via social network services) and also to one or more Social Network Services Databases that have directories of network resources. The APIs also include APIs to support exchange or transfer of network resources, and in an example embodiment include APIs tuned or adapted to request and transfer (e.g. import or export) specific kinds of information, such as contact information and personal profile information, as well as APIs adapted to generally or specifically support exchange or transfer of other network resources.

Other services or functions variously supported by the API's include establishing, maintaining, and closing sessions, where a session tracks a user's interactions with one or more networks over a time period and stores related data, which can for example to support or enable actions or projects that span multiple social networks. Other services and functions variously supported by the APIs include maintaining and administering lists of network resources (e.g. Access Control Lists) for one or more networks, caching to enhance the speed or other quality of a user's experience involving one or more social networks, and monetizing exchanges or interactions between different social networks, e.g. via corresponding social network services.

Generalized Operation

Figure 4:
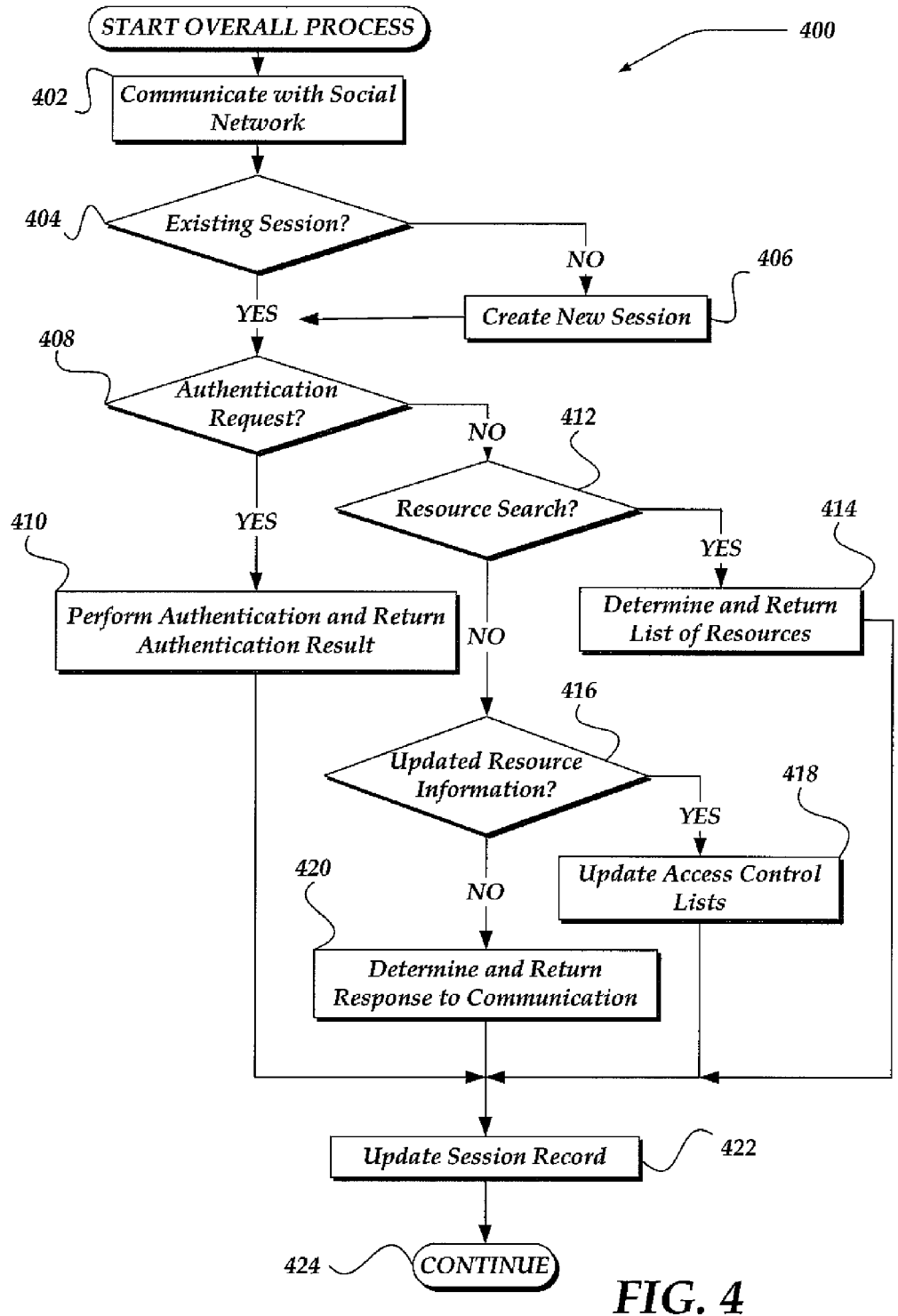
FIG. 4 illustrates a logical flow diagram showing an embodiment of a process from the perspective of a Social Network Services Database.

FIG. 4 illustrates a logical flow diagram showing an embodiment of a process from the perspective of a Social Network Services Database, such as the Social Network Services Database server 109 of FIG. 1. After an initial start block, control proceeds to block 402 where the Database server communicates with a social network, for example via a social network service that corresponds to the social network, e.g. the Social Network Service server 106, 107, for example by receiving a message from the social network or social network service, or optionally by sending a message to the social network or social network service. The communication can, for example, be a request from the social network or social network service for the Social Network Services Database (or the Social Network Authenticator, e.g. relayed through the Database) to authenticate a user whose identification information is provided with the communication. Alternatively, the request can be for a search of network resources in resources listings or ACLs maintained by the Social Network Services Database, or can be information for updating the ACLs, or can simply report on activities of a user and request that the Social Network Services Database update a session associated with the user based on the reported activities. The communication can be initiated by the Social Network Services Database, for example to poll a social network service for resource listing updates. The communication can be provided, and received, via APIs, as described elsewhere herein. In a next block 404 the Social Network Services Database determines whether a session exists for a user mentioned in the communication. The user can be, for example, an individual user that is communicating with the social network service, the social network service or corresponding social network, or another social network or social network service. If in block 404 the determination is that there is not an existing session for or corresponding to the user, then control proceeds to block 406 where a session is created for the user. From block 406, control proceeds to block 408. If in block 404 the determination were positive that a session exists, then control would proceed directly from block 404 to block 408.

In block 408, the Social Network Services Database determines whether the communication received in block 402 represents an authentication request. An authentication request can include, for example, an encrypted user name, password, and namespace and also a timestamp from the social network or social network service.

If the determination in block 408 is affirmative, then control proceeds to block 410, where authentication is performed for the entity or user specified in the request, and the authentication results are returned to the requesting social network or social network service, thus enabling the social network (e.g., via a corresponding social network service) to respond appropriately to whatever caused it to make the authentication request to the Social Network Services Database, for example to provide access and services to the authenticated user based on the authentication (which could be successful authentication, or failed authentication), and on any relevant terms of service between the authenticated user and the social network service or a social network represented by the social network service. In an example embodiment, the Social Network Services Database can convey information from the authentication request to a Social Network Authenticator (e.g. the Authenticator 111) which can then perform the authentication and return the results to the Social Network Services Database and/or the requesting social network or social network service. The authentication can for example be performed based on both information provided with the request and on information stored on or accessed by the Provider with respect to the entity or user purportedly identified by the request, in accordance with known SSO authentication techniques involving for example Microsoft Cardspace™ or OpenID, and/or other authentication techniques.

From block 410, control proceeds to block 422 where the session record (existing, or newly created back in block 406) is updated, and thereafter control proceeds to block 424 where the process continues, for example by starting anew with block 402 or transitioning to another process.

If in block 408 the determination is negative, indicating that the communication is not an authentication request, then control proceeds to block 412 where a determination is made whether the communication represents a search request for the Social Network Services Database to search a resource listing maintained by the Social Network Services Database. If yes, then control proceeds to block 414 where resources in the resource listing that match the search request are identified and those identifications are then returned, for example in the form of a list to the requesting social network service. The search request can for example be for a specific resource on any social network or on a specific social network, such as a listing of members of a social network or of members currently logged in to a social network, for a listing of all resources on a particular social network that are available to a certain class of user (e.g. querying what resources Yahoo 360 is willing to provide to a registered user of MySpace), and so forth. The returned search result can indicate match failure, can indicate successfully matching resources and indications of where to find them (e.g. particular servers or social network services associated with specific social networks that host the or provide access to the desired resources), and can also indicate applicable access restrictions associated with those resources (e.g. whether access is monetized, is restricted in time of availability or in quantity, and so forth). The search result can also indicate if greater particularity of information is available (e.g. possible refinements to the search), or whether the search is too specific and specifies a degree of detail or granularity not found in the Social Network Services Database's resource listing. Resources can include types and topics of content, widgets or software supported by the target social network (the social network whose resource information is sought), aggregate or collective data regarding content or users hosted on the target social network, and so forth.

From block 414 control proceeds to block 422, where the session is updated, and from block 422 the process moves to block 424 where it continues or ends. If in block 412 it is determined that the communication of block 402 is not a resource search request, then control proceeds from block 412 to block 416, where a determination is made whether the communication is a request to update resource information maintained by the Social Network Services Database, such as resource listings of resources available on different social networks. If the determination in block 416 is affirmative, then control proceeds from block 416 to block 418, where the Social Network Services Database updates relevant resource listings or Access Control Lists (ACLs) based on information received from the social network service, for example with respect to resources hosted or maintained by a social network represented by the social network service. The update can include modification of existing resource listings that the Social Network Services Database has for a network, deletion of all listings for a network, or addition of new listings for a network not presently or not previously represented in the resource listings or ACLs of the Social Network Services Database. From block 418 control proceeds to block 422 where the session record is updated, and then from block 422 the process continues in block 424, for example to another process or back to block 402.

If the determination in block 416 is negative and the communication of block 402 does not update the resource listings or ACLs maintained by the Social Network Services Database, then control proceeds to block 420, where a nature of the communication is determined and an appropriate response is returned to the social network (e.g., via a corresponding social network service or other mechanism) that provided the communication, and then from block 420 control proceeds to block 422 where the session is updated, and then to block 424 where the process continues, to another process or back to block 402 to repeat.

Note that in block 422, the session corresponding to the user and/or social network in question can be updated according to actions performed by the Social Network Services Database, and/or on information given to the Social Network Services Database by a social network or social network service, for example in block 402. In block 422 the Social Network Services Database can in an embodiment check all existing sessions records that it is maintaining to discern or determine whether any have timed out or should be deleted for other reasons, and can proceed accordingly to delete or discard old session records or perform other conditional actions specified in a session record.

Block 420 can handle a variety of situations. For example, in block 420 the Social Network Services Database can determine that the communication of block 402 involves a caching request, where information is to be cached and associated with a user's session record so that the information can be efficiently retrieved when the user visits different social networks (e.g. via different social network services) in turn. Cached material can include for example successful results of an authentication for the user that can be valid for a time interval, so that before expiration of that interval authentication of the user can be quickly provided by the Social Network Services Database to inquiring social networks or social network services without having to repeat all or at least some of an authentication computation. Block 420 can also handle a situation where a social network service provides feedback to the Social Network Services Database regarding quality of search information returned by the Social Network Services Database, for example where the Social Network Services Database indicates a resource on another network that turns out to be subject to different access conditions or requirements than those stored in the resource listings of the Social Network Services Database. In this situation the Social Network Services Database can flag the corresponding resource listing or ACL entry and either not provide it to searching or inquiring social networks or social network services or provide it with a caveat. In an example embodiment the Social Network Services Database can also poll a social network service in response to feedback from another social network or social network service, for example to alert the social network of a discrepancy in resource offerings or access conditions and to request updated information for the Social Network Services Database's resource listings. In an example embodiment where multiple Social Network Services Databases (or Social Network Authenticators) handle different tasks, for example authentications by different geographic region, different social network membership or other criteria, when a Social Network Services Database (or Social Network Authenticator) receives an authentication request that involves authenticating a user that the Social Network Services Database is not able or permitted to authenticate, the Social Network Services Database (or Authenticator) can return a suggested identification or address of a different Social Network Services Database or Authenticator that the social network or social network service can or should contact to authenticate the user in question. The communication of block 402 can also involve session update information, where for example a social network service is reporting user activity to the Social Network Services Database so the Social Network Services Database can update one or more sessions associated with the user. For example, where a session record implements a shopping cart supported or enabled by the Social Network Services Database, the user can add items to the shopping cart (e.g. purchases of commercial products) from different networks, and the social network service for each social network where an item is purchased can report the purchase request to the Social Network Services Database which updates the session accordingly. Then, when the Social Network Services Database finally receives word (e.g., through a social network service) that the user making the purchases desires to pay for the goods and check out (thereby finalizing the commercial transactions), the Social Network Services Database can invoke a credit card service (using for example authentication and other information that the Social Network Services Database or Social Network Authenticator has for the user) to execute or complete the transactions that the user has accumulated via the shopping cart. In the event of an error or other event such as a time out of the shopping cart, the Social Network Services Database can terminate or rollback the transactions of the shopping cart.

Figure 5:
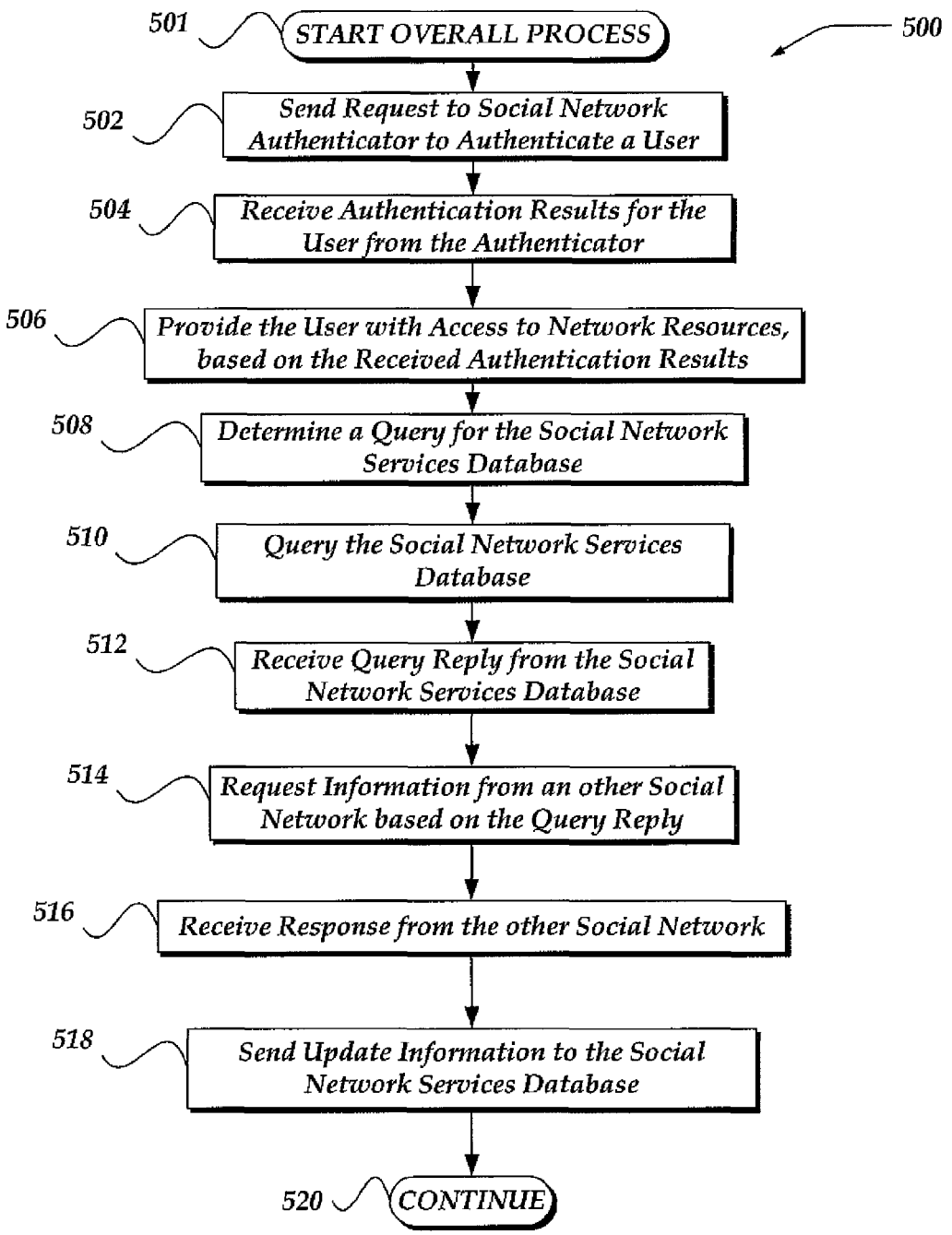
FIG. 5 illustrates a logical flow diagram showing an embodiment of a process from the perspective of a social network service.

FIG. 5 illustrates an example logic flow of actions as seen from the perspective of a social network or social network service such as one or more of the Social Network Service servers 106-107. The actions and functions demonstrated in FIG. 5 can additionally or alternatively be performed by client devices, such as client devices 101-104 including for example mobile devices. The process begins in block 501, where the process starts, and proceeds to block 502 where the social network (e.g., via a corresponding social network service) sends a request to the Social Network Services Database (e.g. the Social Network Services Database server 109) or the Social Network Authenticator (e.g. Authenticator 111) to authenticate a user. The user can be an individual user that has sought to log on to a social network that the social network service represents or administers, or can be a second social network service corresponding to an other social network or user thereof, that has contacted the first social network service with a request on behalf of the user and/or the other social network. Control proceeds from block 502 to block 504, where the social network service receives authentication results from the Social Network Services Database or Social Network Authenticator. Control proceeds from block 504 to block 506, where the social network service provides the authenticated user with access to network resources or otherwise satisfies the user's request. If the received authentication result is unsatisfactory, either because the authentication failed or it turns out that the user is authentic but does not satisfy access requirements administered by the social network service, then the social network service can deny the requested service or information sought by the user.

Control proceeds from block 506 to block 508, where the social network or social network service determines a query for the Social Network Services Database. For example, the social network or social network service can determine or receive a request to search for resources available on other social networks, where the request can come from a user of the social network service's social network, or can come from the social network of the social network service in response to or accordance with a decision by an administrator of the social network, and so forth. For example, an individual user on a first social network might want to access his or her profile or another user's profile on another social network, to import or export specific profile items or items associated with the profile from one network to the other, and could place that request through the social network service. An individual user might also want to expand his contacts with other users and thus might ask his social network to inquire with another social network to help identify potential contacts and/or realize specific contacts with users in the other network, or identify and retrieve other kinds of information from the other network (knowledge base information, media such as sound clips, movies or photographs, listings of interest-focused user groups or subgroups, and so forth). In another example, a first social network can place a request through its social network service to search for resources on other social networks that might be useful to the first social network, for example demographic information regarding other networks' users that can be used to compare user behavior trends, indicate whether users of the first social network might interact well or synergize with users of other selected networks, and so forth.

In a next block 510, the social network or social network service provides the determined query or search for a matching list of network resources to the Social Network Services Database, and in a next block 512 receives the Social Network Services Database's response to the query, including for example a list of network resources that matches the query. In a next block 514 the social network service contacts another social network service (e.g., using common APIs) to request information or a service. For example, the request can be for a resource that was identified in the search result returned in block 512, where the search result also indicated or identified a social network hosting the resource, and/or a social network service of the hosting social network, and access conditions specified or required by the hosting social network or social network service for permitting another social network or user to access the resource. The search result can, for example, include all relevant information from resource listings of the Social Network Services Database or any portion thereof, and can include alternate sources of the resource, optional terms for accessing the resource (e.g. different access or monetization options), and so forth. Note that the request of block 514 can include identification information of the requesting social network service, the requesting social network service's network (e.g. structured social network), and of an individual user who originally requested the information or otherwise initiated the request (if applicable). The other social network service can use this information to send an authentication request to the Social Network Services Database (e.g., using the process of blocks 502-504) before responding to the request (e.g. block 506).

In a next block 516 the requesting social network or social network service receives a response from the other network, and uses or processes it accordingly, for example by incorporating the received information into the social network of the requesting social network service, passing information to an individual user who initiated the request process, and so forth.

In a next block 518, the social network or corresponding social network service sends updated information to the Social Network Services Database. This information can include, for example, information regarding the user's activities so that the Social Network Services Database can update a session corresponding to the user. Additionally or alternatively the information can include user authentication information for updating user records that the Social Network Services Database maintains to support authentication services, updated resource listing information from the social network that the social network service represents, feedback information to the Social Network Services Database regarding search results given by the Social Network Services Database to the social network service (e.g., an indication of mismatch between search results and actual resources and corresponding access conditions or requirements), and so forth. Control proceeds from block 518 to block 520, where the process continues by returning to one of the previous blocks or proceeding to another process or ending.

It will be understood that the actions shown in FIGS. 4-5 can be performed in different orders than those shown, and can be variously combined or modified by adding other actions or selectively omitting illustrated actions in accordance with specific circumstances and applications.

It will also be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected is:

1. A network device configured to manage communications, comprising:
    a transceiver to send and receive data; and
    a processor to execute instructions that perform actions for:
        receiving a request from a first social network to authenticate a user, wherein the request identifies the user and the first social network;
        processing the request and providing authentication results to the first social network;
        creating a session record, wherein the session record identifies the user and the first social network;
        receiving a request from the first social network regarding availability to the user for a list of resources on a second social network; and
        determining those resources on the list that are available to the user on the second social network and a cost to use those resources based on the request and returning the determined list to the first social network, wherein the determined list indicates conditions for the first social network to interoperate with the second social network to access, employ at least a related action to pay the cost based at least in part on an amount of an imbalance of sharing resources between the first social network and the second social network, and make available to the user through the first social network the resources in the determined list.

2. The network device of claim 1, wherein the processor further performs actions for:
    receiving a request from the second network to authenticate the user, wherein the request identifies the user and the second social network;
    processing the request and providing authentication results to the second social network; and
    adding an identification of the second social network to the session record.

3. The network device of claim 1, wherein the processor further performs actions for:
    determining if an existing session record identifying the user exists, and if yes then adding an identification of the first social network to the existing session record instead of performing the step of creating the session record; and
    determining if a time period since the existing session record was last updated exceeds a predetermined threshold value, and if yes then deleting the existing session record.

4. The network device of claim 1, wherein the resources in the list comprise at least one of a profile of a user, a web page of a user, a list of members of the second social network, or multimedia information associated with a user.

5. The network device of claim 1, wherein the processor further performs actions for:
    receiving activity information from the first social network regarding activity of the user with the first social network; and
    updating the session record based on the received activity information.

29

6. The network device of claim 1, wherein the processor further performs actions for:
receiving from a social network, access control lists indicating resources on the social network and conditions for accessing the indicated resources from outside the social network;
storing the received access control lists; and
accessing the received access control lists in response to a query from an other social network.

7. A network device configured to manage communications, comprising:
a transceiver to send and receive data over a social network; and
a processor to execute instructions that perform actions for:
sending a request to a social network services database to authenticate a user, wherein the request includes identification information for the user;
receiving authentication results for the user from the social network services database;
providing the user with access to resources of a first social network, based on the received authentication results;
receiving a request from the user;
querying the service provider for a list of resources available to the user on a second social network and a cost to use those resources;
receiving the list of resources from the social network services database, wherein the list indicates conditions for the first social network to interoperate with the second social network to access, employ at least a related action to pay the cost based at least in part on an amount of an imbalance of sharing resources between the first social network and the second social network, and make available to the user through the first social network the resources in the list;
requesting information from the second social network based on the request from the user and the received list of resources; and
receiving requested information from the second social network.

8. The network device of claim 7, wherein the processor further executes instructions for actions for:
providing profile information of the user to the second social network.

9. The network device of claim 7, wherein the processor further executes instructions for actions for:
providing information to the social network services database regarding the received request from the user, for inclusion in a session record of the social network services database, wherein the session record identifies the user.

10. A method for managing communications, comprising:
receiving a request from a first social network to authenticate a user, wherein the request identifies the user and the first social network;
processing the request and providing authentication results to the first social network;
creating a session record, wherein the session record identifies the user and the first social network;
receiving a request from the first social network for a list of resources available to the user on a second social network; and
determining the list of resources based on the request and a cost to use those resources and returning the list to the first social network, wherein the list indicates conditions for the first social network to interoperate with the second social network to access, employ at least a related

30 action to pay the cost based at least in part on an amount of an imbalance of sharing resources between the first social network and the second social network, and make available to the user through the first social network resources in the list.

11. The method of claim 10, further comprising:
receiving a request from the second social network to authenticate the user, wherein the request identifies the user and the second social network;
processing the request and providing authentication results to the second social network; and
adding an identification of the second social network to the session record.

12. The method of claim 10, further comprising:
providing the user with access to resources of the first social network, based on the authentication results;
requesting information from the second social network based on a request from the user and the determined list of resources; and
receiving requested information from the second social network.

13. A computer readable non-transitive storage medium that includes data and instructions, wherein the execution of the instructions provides for social network content over a network by enabling actions, comprising:
receiving a request from a first social network to authenticate a user, wherein the request identifies the user and the first social network;
processing the request and providing authentication results to the first social network;
creating a session record, wherein the session record identifies the user and the first social network;
receiving a request from the first social network regarding availability to the user for a list of resources on a second social network; and
determining those resources on the list that are available to the user on the second social network based on the request and a cost to use those resources and returning the determined list to the first social network, wherein the determined list indicates conditions for the first social network to interoperate with the second social network to access, employ at least a related action to pay the cost based at least in part on an amount of an imbalance of sharing resources between the first social network and the second social network, and make available to the user through the first social network the resources in the determined list.

14. The medium of claim 13, the actions further comprising:
receiving a request from the second social network to authenticate the user, wherein the request identifies the user and the second social network;
processing the request and providing authentication results to the second social network; and
adding an identification of the second social network to the session record.

15. The medium of claim 13, the actions further comprising:
providing the user with access to resources of the first social network, based on the authentication results;
requesting information from the second social network based on a request from the user and the determined list of resources; and
receiving requested information from the second social network.

16. A system that provides social network content over a network, comprising:

a first network device that includes:
  a transceiver for communicating with at least one mobile device; and
  a processor for executing instructions that perform actions, comprising:
    receiving a request from a second network device to authenticate a user, wherein the request identifies the user and a social network;
    processing the request and providing authentication results to the second network device;
    creating a session record, wherein the session record identifies the user and the social network;
    receiving a request from the second network device for a list of resources that are available to the user on an other social network;
    determining those resources on the list that are available to the user based on the request and a cost to use those resources and returning the determined list to the second network device, wherein the determined list indicates conditions for the social network to interoperate with the other social network to access, employ at least a related action to pay the cost based at least in part on an amount of an imbalance of sharing resources between the first social network and the second social network, and make available to the user through the social network the resources in the determined list; and
the second network device that further includes:
  a transceiver for communicating with at least the first network device over the network; and
  a processor for executing instructions to perform actions, comprising:
    communicating with at least the first network device; and
    downloading social network content from at least the social network and the other social network.

17. The system of claim 16, wherein the second network device is a mobile device and enables further actions, including:
  receiving a request from the mobile device to authenticate the user, wherein the request identifies the user and the mobile device;
  processing the request and providing authentication results to the mobile device; and
  adding an identification of the mobile device to the session record.

18. The system of claim 16, wherein the first network device enables further actions, including:
  providing the user with access to resources of a first social network, based on the authentication results; and
  receiving and processing an authentication request from the other social network to authenticate the user, wherein the other social network enables download of content to the second network device based on a reply to the authentication request.

19. A mobile device for accessing social network data, comprising:
  a transceiver for communicating with at least one network device; and
  a processor for executing instructions that perform actions, comprising:
    sending a request to a social network services database to authenticate a user, wherein the request includes identification information for the user;
    receiving authentication results for the user from the social network services database;
    querying the social network services database for a list of resources on a first social network that are determined to be available to the user and a cost to use those resources;
    receiving the determined list of resources from the social network services database, wherein the determined list indicates conditions for a second social network to interoperate with the first social network to access, employ at least a related action to pay the cost based at least in part on an amount of an imbalance of sharing resources between the first social network and the second social network, and make available to the user through the first social network the resources in the determined list;
    sending a request for information from the second social network based on the received determined list of resources, wherein the request identifies the user and enables the second social network to send an authentication request to the social network services database; and
    receiving requested information from the first social network that is provided to the second social network.

20. The mobile device of claim 19, wherein the processor is operative to enable actions for:
  providing information to the social network services database regarding information received from the first social network;
  querying the service provider for a list of resources on the second social network in response to a request from the user;
  receiving another list of resources of the second social network that are available to the user;
  sending a query to the second social network based on the received list of resources of the second social network and the request from the user, wherein the query identifies the user and enables the second social network to request authentication of the user; and
  receiving a reply to the query to the second social network, wherein the reply includes a personal profile of the user for the second social network.

21. The mobile device of claim 19, wherein the processor is operative to enable actions for:
  updating session information of the user stored in the social network services database, based on replies from the first social network and the second social network.

22. The mobile device of claim 19, wherein the processor is operative to enable actions for:
  processing a commercial transaction based on session information of the user stored in the social network services database, wherein the session information indicates interactions of the user with different social networks.

* * * * *